Jan. 30, 1968  E. V. CAVAGNERO ETAL  3,365,775
METHOD OF MAKING BEARING SEPARATORS AND THE LIKE
Filed April 21, 1967  2 Sheets-Sheet 1

INVENTORS
ERMAN V. CAVAGNERO
HALSEY W. SKILTON
HENRY W. MACIOROWSKI
BY McCormick, Paulding & Huber
ATTORNEYS Jan. 30, 1968   E. V. CAVAGNERO ET AL   3,365,775
METHOD OF MAKING BEARING SEPARATORS AND THE LIKE
Filed April 21, 1967                                2 Sheets-Sheet 2

United States Patent Office 3,365,775
Patented Jan. 30, 1968

3,365,775
METHOD OF MAKING BEARING SEPARATORS AND THE LIKE
Erman V. Cavagnero, Torrington, Conn., Henry W. Maciorowski, Westfield, Mass., and Halsey W. Skilton, New Hartford, Conn., assignors to The Torrington Manufacturing Company, Torrington, Conn., a corporation of Connecticut
Continuation-in-part of application Ser. No. 442,018, Mar. 23, 1965. This application Apr. 21, 1967, Ser. No. 632,824
16 Claims. (Cl. 29—148.4)

ABSTRACT OF THE DISCLOSURE

Method of making bearing separators comprising steps of progressively blanking a long strip of metal to form series of slots, cutting sections from strips to form flat blanks with reduced width portions adjacent each end edge of blanks, forming blanks into rings and welding and slightly expanding rings laterally at reduced width portions to provide smooth straight sides. For tapered bearings one end of rings are reduced diametrically during or after ring formation.

Cross-reference to related application

This application is a continuation-in-part of U.S. application, Ser. No. 442,018 filed Mar. 23, 1965, now abandoned entitled, Method of Making Bearing Separators and the Like, in the names of Erman V. Cavagnero, Henry W. Maciorowski and Halsey W. Skilton.

Background of invention

In the manufacture of separators for roller bearings it is a conventional practice to draw a small cup and to thereafter sever the closed end of the cup to provide a ring. The ring is then formed and blanked as required to provide a cylindrical or tapered separator with an annular series of laterally extending slots for receiving roller bearings. While such a method of manufacture is generally satisfactory, it is nevertheless subject to significant improvement in respect to the speed with which separators are produced. Moreover, detrimental stresses may result in the finished separator, this arising primarily from the drawing operation, and there may be problems in holding close metal thickness tolerances from one side of the separator to the other.

Summary of invention

It is the general object of the present invention to provide a method for making separators and the like from strip stock wherein blanking and forming operations are carried out conveniently prior to the formation of a ring and wherein contiguous end portions of a ring are resistance welded to provide a high quality separator in a minimum of time and at economic advantage; one end portion of the ring being diametrically reduced when a tapered separator is required.

The drawing shows four preferred forms of the method of the present invention and such methods will be described, but it will be understood that various changes may be made from the methods disclosed, and that the drawing and description are not to be construed as defining or limiting the scope of the invention, the claims forming a part of this specification being relied upon for that purpose.

Description of preferred embodiments

Figure 1:
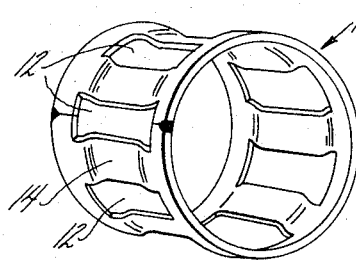
FIG. 1 is a perspective view of a cylindrical bearing separator manufactured in accordance with the method of the present invention.

Referring particularly to FIG. 1, it will be observed that a bearing separator indicated generally at 10 has a cylindrical or ringlike configuration and is provided with an annular series of small axially or laterally elongated slots 12, 12. The slots 12, 12 are adapted to at least partially receive and hold roller bearings and the assembled bearing separator and rollers may be employed in a conventional manner about a shaft, within a bore, etc. A central portion 14 of the ring is offset radially inwardly in the separator 10, but it will be quite obvious that other separator configurations can be conveniently produced in the exercise of the method of the present invention.

Figure 3:
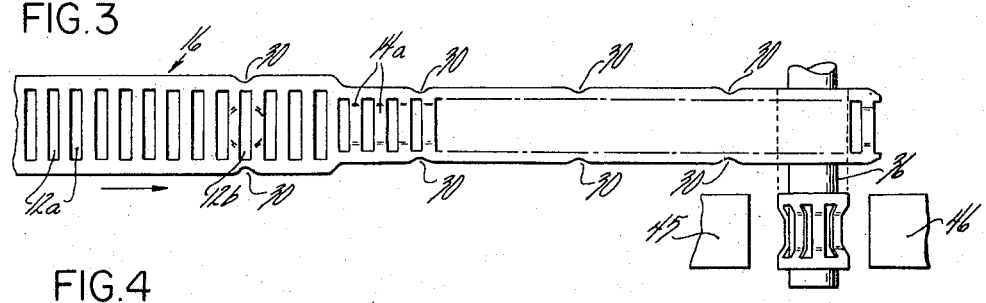
FIG. 3 is a plan view showing an elongated strip of sheet metal from which the blanks of FIG. 2 are formed.
Figure 4:
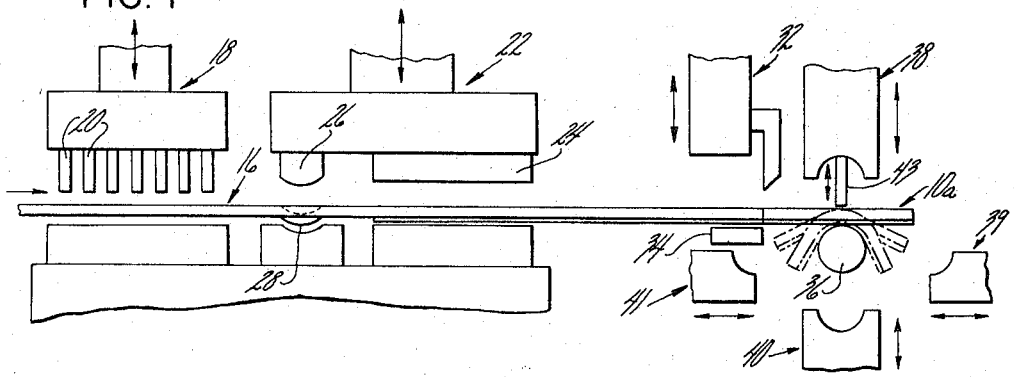
FIG 4 is a side view showing the strip of FIG. 3 together with blanking, forming and cut-off tools shown in schematic form.

In FIGS. 3 and 4 an elongated strip of flat sheet metal is shown with portions thereof in progressive stages of blanking and forming operations. Blanking and forming devices and a welding mechanism are illustrated schematically to represent a vertical four-slide machine of a type which is well suited to the exercise of the method of the present invention. A machine of the type mentioned is more fully illustrated and described in the Vogt U.S. Patent No. 3,052,392 on "Wire Forming Machine" and the Vogt et al. U.S. Patent No. 3,092,709 on "Attachment for a Wire or Strip Forming Machine."

In a vertical four-slide machine of the type mentioned, a feed mechanism advances wire or flat strip stock in a selected longitudinal direction for progressive blanking and/or forming operations. As illustrated in FIGS. 3 and 4, the strip 16 is advanced intermittently from left to right by a feed mechanism not shown and a first step of the method of the invention is carried out by a blanking press 18. Tools 20, 20 provide a longitudinally extending series of laterally elongated slots 12a, 12a in the strip 16.

On advance of the strip to a second work station a forming press 22 carries out a second step in the method of the invention. The forming tool 24 depresses a central longitudinally extending portion 14a, 14a of the strip 16 whereby to provide for the radially inwardly offset central portion 14 in a finished separator ring 10.

Further, the press 22 includes a tool 26 which provides a small centrally located depression or "bubble" in the strip 16 and, more specifically, in central portions of two laterally extending bars adjacent a selected slot such as 12b shown in FIG. 3. The effect of the small depression or bubble, shown at 28 in FIG. 4, is to draw opposite portions 30, 30 of the strip 16 laterally inwardly as best illustrated in FIG. 3. Subsequently, and as the bubble 28 is engaged and acted upon by the forming tool 24, the bubble is removed but the laterally inwardly drawn edge portions 30, 30 remain, if somewhat more shallow in extent and appearance. The inwardly drawn portions may extend in the neighborhood of five to ten thousandths inwardly from the outer or side edge of the strip after removal or flattening of the bubble 28.

Figure 2:
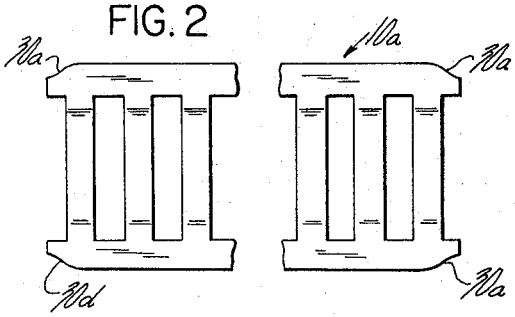
FIG. 2 is a plan view of a flat sheet metal blank from which separators of the type shown in FIG. 1 are formed.

A next step in the method of the invention involves the severing of a forwardmost portion of the advanced strip 16 to form a blank 10a. A cut-off tool 32 is movable vertically toward and away from the strip 16 and cooperates with a small anvil 34 to effect cut-off at least approximately along the longitudinal center line of the selected slot 12b. Thus, the blank 10a, as best illustrated in FIG. 2, has a slightly reduced width portion 30a, 30a adjacent at least one end portion thereof and, as shown, the said blank is provided with such reduced width portions adjacent each end edge thereof. Further, the blank 10a is of a length slightly greater than the desired circumference of a completed ring 10.

The next step in the method of the invention involves the forming of the blank 10a into the cylindrical configuration of the ring 10 and this operation is accomplished by means of a center form or mandrel 36 and four reciprocable tools 38, 39, 40 and 41. The tools 38, 39, 40 and 41 are disposed in a hub-spoke arrangement about the center form or mandrel 36 and are conventionally operated sequentially to form the blank 10a to a ring, the blank being initially secured in place on the mandrel or center form 36 by means of a hold-down device 43.

Following the formation of the ring 10, the ring is moved forwardly on the mandrel or center form 36 to a position shown in FIG. 3. At this forward position, a pair of welding electrodes 45, 46 are moved inwardly to accomplish the resistance welding of the ring. The electrodes 45, 46 maintain the ring under slight compression during the welding operation whereby to join the end portions of the ring and to slightly compress the ring circumferentially so as to bring it to the desired circumference and diameter. Moreover, slight lateral expansion of the ring occurs at the joint so as to effectively fill the depressions or reduced width portions 30a, 30a and to provide smooth straight side edges of the finished ring as illustrated in FIG. 1.

From the foregoing it will be apparent that it is an important feature of the method of the present invention to provide the reduced width portions 30a, 30a adjacent the end edges of the blank 10a. Further, it is an important feature of the method to compress the ring slightly during resistance welding and to cause the necessary slight lateral expansion at the portions 30a, 30a to provide the desired smooth straight side edges. Expensive subsequent grinding operations are thus avoided and a high quality bearing separator is provided.

Figure 5:
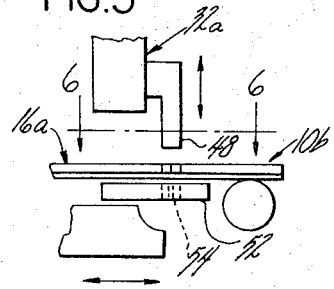
FIG. 5 is a partial schematic view similar to FIG. 4 but showing cut-off tooling employed in the practice of an alternative form of the method of the present invention.

In FIG. 5 there is shown a mechanism which can be employed in the exercise of an alternative method under the present invention. In the alternative method, the steps leading up to cutoff are carried out as described above with the exception of the introduction of the depression or bubble 28 in the strip 16a. A cut-off device 32a is provided with a tool 48 having similar generally V-shaped opposite end portions 50, 50 adapted to remove small V-shaped portions of the strip 16a as illustrated at 30b, 30b in FIG. 7. Thus, the tool 48 not only severs the blank 10b from the strip 16a but it also provides the desired reduced width portions adjacent the end edges of the blank.

When the blank 10b is subsequently formed and welded in the manner described above for the blank 10a, a completed ring such as 10 is provided with smooth straight side edges at the joint.

Returning now to FIG. 5, it will be observed that an anvil 52 cooperates with the cut-off tool 48 and that an opening 54 is provided in the anvil to receive the said tool. The anvil 52 is withdrawn rearwardly as indicated by the arrow 56 in FIG. 6 after cutoff has been completed so as to allow for the downward arcuate movement of the left-hand or trailing end portion of the blank 10b. Full illustration and description of the construction and operation of a vertical four-slide machine including a rearwardly movable anvil such as the anvil 52 can be found in copending U.S. application Ser. No. 429,292 on "Cut-Off Means in Wire or Strip Forming Machine," filed Feb. 1, 1965, in the name of Henry W. Maciorowski.

Figure 6:
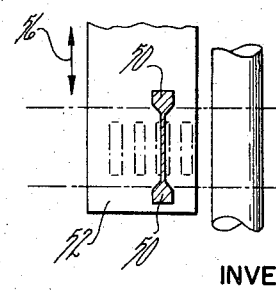
FIG. 6 is a top view taken generally as indicated at 6—6 in FIG. 5.
Figure 7:
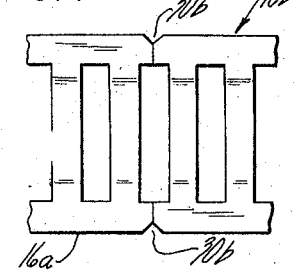
FIG. 7 is an enlarged fragmentary plan view showing adjacent end portions of blanks of the type illustrated above in FIGS. 2 and 3.

From the foregoing it will be apparent that the alternative method of FIGS. 5 through 7 also provides for the production of separator rings of high quality. Moreover, separator rings and the like can be produced in accordance with either of the aforesaid forms of the method of the present invention at a rate substantially in excess of that attainable with the aforementioned conventional method. Separator rings have been produced at rates 8 to 12 times higher than those of the prior method.

Figure 8:
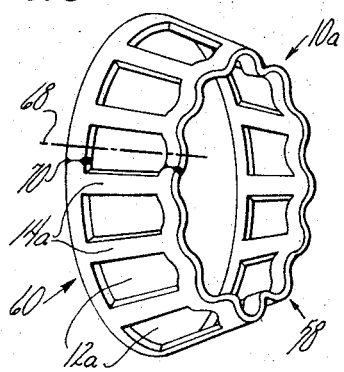
FIG. 8 is a perspective view of a tapered or frustoconical bearing separator manufactured in accordance with the method of the present invention.
Figure 9:
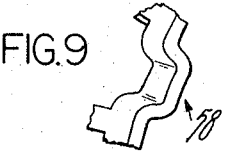
FIG. 9 is an enlarged fragmentary perspective illustrating a small part in the form of a castellated convolution of a diametrically reduced end portion of a separator similar to the tapered separator of FIG. 8.
Figure 13:
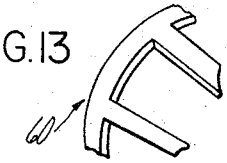
FIG. 13 is an enlarged fragmentary perspective illustrating a small part of an opposite end portion of a tapered separator like FIG. 10 and showing an as-formed configuration.
Figure 10:
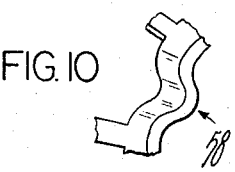
FIG. 10 is an enlarged fragmentary perspective illustrating a small part in the form of a shallow arcuate convolution of a diametrically reduced end portion of a separator similar to the tapered separator of FIG. 8.
Figure 11:
FIG. 11 is an enlarged fragmentary perspective illustrating a small part in the form of a collapsed shallow arcuate convolution of a diametrically reduced end portion of a separator similar to the tapered separator of FIG. 8.
Figure 15:
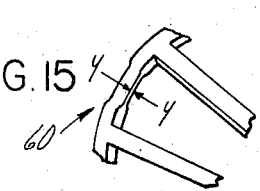
FIG. 15 is an enlarged fragmentary perspective illustrating a small part of an opposite end portion of a tapered separator like FIG. 10 and showing a reduced and stretched configuration employed in diametrically enlarging said opposite end portion of the separator.

The bearing separator of FIG. 8 is of the aforementioned tapered or frusto-conical configuration and includes a diametrically reduced end portion 58 and an opposite end portion 60 which may remain in an "as-formed" condition or which may be stretched and diametrically enlarged. The separator includes small axially or laterally elongated slots 12a, 12a separated by bars 14a, 14a. At its reduced end portion 58, the separator takes a scalloped or convoluted configuration and such configuration may vary as illustrated in FIGS. 9 through 12. In FIG. 9 there is shown a castellated convolution which is representative of convolutions which can be formed throughout the peripheral extent of the reduced end portion 58 of a separator such as 10a. FIG. 10 illustrates a shallow arcuate convolution which may be taken as representing the convolutions of the separator 10a of FIG. 8. FIG. 11 illustrates a collapsed shallow arcuate convolution which may be employed for more extensive diametrical reduction of the end portion 58. FIG. 15 shows a convolution similar to FIG. 10 but which is substantially deeper and which may also be employed where a relatively high degree of diametrical reduction of an end portion 58 is required.

Figure 14:
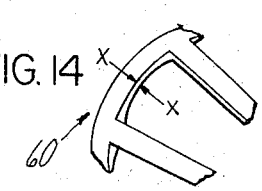
FIG. 14 is an enlarged fragmentary perspective illustrating a small part of an opposite end portion of a tapered separator like FIG. 10 and showing a stretched configuration employed in diametrically enlarging said opposite end portion of the separator.
Figure 12:
FIG. 12 is an enlarged fragmentary perspective illustrating a small part in the form of a deep arcuate convolution of a diametrically reduced end portion of a separator similar to the tapered separator of FIG. 8.

The opposite or larger end portion 60 of a separator such as 10a may remain in an "as-formed" configuration as illustrated in FIG. 12. That is, the end portion 58 of a cylindrical ring may be worked on exclusively with little or no effect on the end portion 60. Where a greater differential diameter between large and small end portions 60 and 58 is required, it may be desirable to somewhat stretch the large end portion 60 of a separator ring as illustrated in FIG. 14. Thus, stretching can be provided for to effect diametral enlargement of the end portion 60 and a somewhat reduced central portion of each interbar section of the end portion 60 results. Still further, forming tools may be employed at each inter-bar section of the end portion 60 to positively provide a reduced thickness area y, y as shown in FIG. 15 and at the same time to effect a stretching and a diametral enlargement of the end portion 60.

Figure 16:
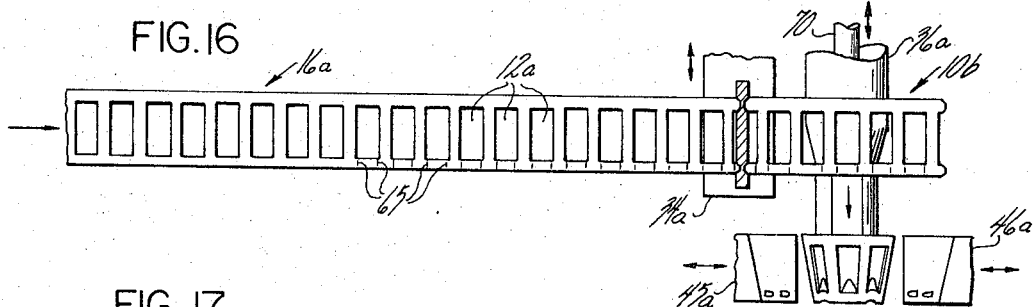
FIG. 16 is a plan view showing an elongated strip of sheet metal for forming a tapered separator in a one-step forming embodiment of the method, and includes schematic illustration of the forming and welding apparatus.
Figure 17:
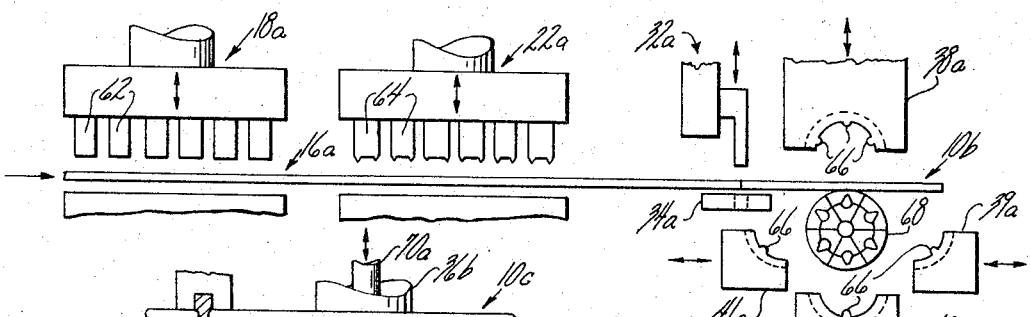
FIG. 17 is a side view showing the strip of FIG. 16 and further illustrating the forming apparatus.

In FIGS. 16 and 17 elongated strip 16a is fed rightwardly in an intermittent manner and a press 18a includes blanking tools 62, 62 for providing the slots 12a, 12a. A press 22a is preferably provided and includes tools 64, 64 adapted to provide small lateral bend lines 65, 65 along one edge of the strip i.e. the strip edge to be employed in forming the smaller or diametrically reduced end portion 58 of a separator such as 10a. The bend lines 66 facilitate considerably the subsequent formation of the convolutions such as shown in FIG. 8 at the end portion 58.

A cut-off mechanism 32a may be substantially identical with the mechanism 32 above and includes a similarly operable retractable mandrel 34a. Preferably, however, the location of cut-off is somewhat changed from that described above for the cylindrical separator 10. In the case of a tapered or frusto-conical separator such as 10a it is found desirable to off-set the cut-off operation with respect to the centerline of the inter-bar sections of the end portions 58-60. That is, a centerline 68 through the slot 12 at the contiguous ends of the separator is displaced in FIG. 8 with respect to the cut-off and weld area 70. It is found undesirable to locate the cut-off and weld area precisely at the centerline due to the fact that maximum stress is encountered at this point in the formation of the convolutions at the smaller or diametrically reduced end portion 58 of the separator.

FIGS. 16 and 17 illustrate an embodiment of the method wherein a blank such as 10b is formed to a circular or ring configuration and to a tapered or frusto-conical configuration in a single operation. As described above, the end portion 58 is diametrically reduced in all cases but the end portions 60 may remain in an "as-formed" configuration or may be stretched so as to be diametrically enlarged. A center form or mandrel 36a has a rear working station beneath the blank 10b and a forward working station between welding electrodes 45a and 46a. At the rear working station tools 38a, 39a, 40a, and 41a, corresponding to the above tools 38, 39, 40 and 41, are arranged in a hub spoke configuration and preferably operate sequentially to bend the blank 10b into a ring to reduce the end portion 58 diametrically, and optionally to enlarge the end portion 60. The tools 38a, 39a, 40a, and 41a include small convolution forming elements 66, 66 and the mandrel 36a is preferably segmented as indicated at 68 and expandable at both forward and rear stations. A small control rod 70, best shown in FIG. 16, controls expansion and contraction of the mandrel in appropriately timed relationship with the feed and working conditions of the apparatus. Thus, the mandrel can be expanded at its rear station during forming of the ring thereabout, contracted for a forward feed movement of a formed separator to the forward station, expanded for a welding operation involving inward movement of the welding electrodes 45a, 46a, and thereafter again contracted for ready forward ejection of the completed separator.

Figure 18:
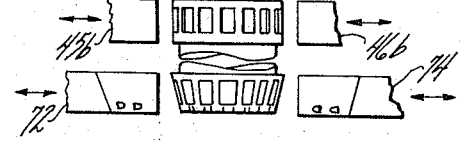
FIG. 18 is a schematic illustration of a two-step forming embodiment of the method and apparatus employed in the practice thereof.

In FIG. 18 there is shown schematically apparatus wherein the method of the present invention is carried out in a two step operation in the formation of a tapered or frusto-conical separator. A blank 10c is shown positioned above the mandrel 36b at a first work station wherein tools not shown operate on the blank to bend the same into a cylindrical or ring-like configuration. After the separator has been so formed it is fed forwardly along the mandrel 36b to a second work station between welding electrodes 45b and 46b. On completion of welding at the second station the separator is again fed forwardly to a third station between the tools 72, 74. There may be of course other tools located at the third work station in addition to the tools 72 and 74 shown, and the said tools cooperate to reduce the diameter of the forward end portion of the separator and, if desired, to expand or enlarge the diameter of the rear portion of the separator. The mandrel 36b is preferably provided with an expandable section at least the third work station which may be operated by a push-pull rod 70a.

We claim:

1. A method of making bearing separators and the like comprising the steps of providing an elongated main strip of thin flat metal for the formation of a longitudinal series of blanks, progressively blanking said elongated strip to provide a longitudinally extending series of laterally elongated slots adapted to at least partially receive roller bearings, progressively forming and severing selected portions of the strip to provide blanks from the main strip with reduced width portions adjacent each end edge of each blank, forming each said blank into a ring of generally cylindrical configuration, and resistance welding continguous end portions thereof whereby to join said end portions to slightly compress the ring circumferentially and to slightly expand the ring laterally at said reduced width portion and thereby provide smooth straight side edges at the joint.

2. A method for making bearing separators and the like as set forth in claim 1 wherein the forming of selected portions of the main strip takes the form of the provision of and the subsequent flattening of small bubbles in the strip.

3. A method for making bearing separators and the like as set forth in claim 1 wherein the cut-off operations are carried out approximately along the longitudinal centerlines of selected small slots.

4. A method for making bearing separators and the like as set forth in claim 1 wherein the step of forming and severing said blanks includes the removal of small portions of the strip at each lateral end of and at each longitudinal side of each cut-off line.

5. A method for making bearing separators and the like as set forth in claim 4 wherein the cut-off operations are carried out approximately along the longitudinal centerlines of selected small slots.

6. A method of making bearing separators and the like as set forth in claim 1 wherein the step of forming each blank into a ring of generally cylindrical configuration includes the step of diametrically reducing one end portion of the ring whereby to provide tapered separators.

7. A method for making bearing separators and the like as set forth in claim 6 wherein the step of forming each blank into a ring of generally cylindrical configuration includes the step of diametrically enlarging an opposite end portion of each ring.

8. A method for making bearing separators and the like as set forth in claim 6 wherein the step of diametrically reducing one end portion of each ring includes the formation of convolutions at inter-bar sections of said end portion.

9. A method for making bearing separators and the like as set forth in claim 8 wherein bend lines are formed at said inter-bar sections prior to formation of said convolutions.

10. A method for making bearing separators and the like as set forth in claim 8 wherein said convolutions are formed at the inter-bar sections with the area of greatest metal displacement approximately at the center of each inter-bar section, and wherein the severing operation is carried out at an area substantially removed from the center of an inter-bar section.

11. A method for making bearing separators and the like as set forth in claim 6 wherein the steps of forming each blank into a ring and diametrically reducing one end portion of the ring are carried out simultaneously in a single forming operation prior to welding.

12. A method for making bearing separators and the like as set forth in claim 6 wherein the steps of forming each blank into a ring and diametrically reducing one end portion of the ring are carried out separately in a two-stage operation with ring formation preceding welding and diametral reduction following the welding operation.

13. A method for making tapered bearing separators and the like comprising the steps of providing cylindrical separators each with a circumaxially spaced series of axially elongated slots separated by a similar series of axially elongated bars and adapted to at least partially receive roller bearings and with opposite end portions each comprising peripherally extending thin sheet metal bands which include welded contiguous ends and which are integrally connected with the ends of the bars, and diametrically reducing one end portion of each separator by displacing free interbar sections of the band thereof in a generally radial direction and out of the surface of revolution defined by the separator.

14. A method of making tapered bearing separators and the like as set forth in claim 13 and including the step of diametrically enlarging an opposite end portion of each cylindrical separator.

15. A method of making tapered bearing separators and the like as set forth in claim 13 wherein the step of diametrically reducing an end portion of each separator includes the formation of convolutions at said interbar sections of the band.

16. A method of making bearing separators and the like as set forth in claim 15 wherein said convolutions are formed at the interbar sections with the area of greatest metal displacement approximately at the center of each interbar section, and wherein the aforesaid welded contiguous ends of the band are substantially removed from the center of an interbar section.

References Cited
UNITED STATES PATENTS

| | | | |
|---|---|---|---|
| 1,446,487 | 2/1923 | Timken | 113—117 X |
| 1,857,505 | 5/1932 | Heineman | 219—105 X |
| 2,294,289 | 8/1942 | Frauenthal | 29—148.4 |
| 2,591,160 | 4/1952 | Kilian | 308—217 |

THOMAS H. EAGER, *Primary Examiner.*